(12) United States Patent  
Drucker

(10) Patent No.: US 9,894,481 B2  
(45) Date of Patent: *Feb. 13, 2018

(54) LOCATION-TRANSMITTING DEVICE FOR DETERMINING LOCATION OF A WIRELESS COMMUNICATION DEVICE

(71) Applicant: Empire Technology Development LLC, Wilmington, DE (US)

(72) Inventor: Elliott Drucker, Kirkland, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,721

(22) Filed: Dec. 17, 2015

(65) Prior Publication Data

US 2016/0112840 A1 Apr. 21, 2016

Related U.S. Application Data

(63) Continuation of application No. 13/515,001, filed as application No. PCT/US2011/037314 on May 20, 2011, now Pat. No. 9,258,680.

(51) Int. Cl.
*H04W 24/00* (2009.01)
*H04W 4/02* (2009.01)
(Continued)

(52) U.S. Cl.
CPC ............ *H04W 4/023* (2013.01); *H04W 4/02* (2013.01); *H04W 4/043* (2013.01); *H04W 76/007* (2013.01); *H04M 2242/30* (2013.01); *H04W 4/008* (2013.01); *H04W 4/22* (2013.01); *H04W 64/00* (2013.01)

(58) Field of Classification Search
USPC .......................... 455/456.1, 404.1; 370/328
See application file for complete search history.

(56) References Cited

U.S. PATENT DOCUMENTS 7,013,165 B2 3/2006 Yoon et al.
2004/0033795 A1 2/2004 Walsh et al.
(Continued)

FOREIGN PATENT DOCUMENTS

WO 2010116042 A1 10/2010

OTHER PUBLICATIONS

International Search Report and Written Opinion of the International Searching Authority, International application No. PCT/US2011/037314, Aug. 3, 2011.
(Continued)

*Primary Examiner* — David Q Nguyen
(74) *Attorney, Agent, or Firm* — Turk IP Law, LLC

(57) ABSTRACT

In a wireless communication device, an example method of transmitting location data for a location of the wireless communication device includes using a short-range radio communication protocol to receive, without prior interrogation, radio signals from any nearby autonomously transmitting radio-transmitting device, detecting the location data in a radio signal from a nearby autonomously transmitting radio-transmitting device, wherein the radio signal is the strongest radio signal that includes location data, measuring a received signal level of the radio signal from the autonomously transmitting radio-transmitting device, and transmitting the location data and the received signal level of the radio signal to a third party.

21 Claims, 4 Drawing Sheets

(51) Int. Cl.
  *H04W 4/04*   (2009.01)
  *H04W 76/00*  (2009.01)
  *H04W 4/22*   (2009.01)
  *H04W 4/00*   (2009.01)
  *H04W 64/00*  (2009.01)

(56) References Cited

U.S. PATENT DOCUMENTS

| | | | |
|---|---|---|---|
| 2008/0181172 A1* | 7/2008 | Angelhag | G01S 5/14 |
| | | | 370/328 |
| 2008/0280624 A1 | 11/2008 | Wrappe | |
| 2009/0066788 A1* | 3/2009 | Baum | G06F 17/30017 |
| | | | 348/143 |
| 2009/0138353 A1 | 5/2009 | Mendelson | |
| 2009/0138600 A1* | 5/2009 | Baum | H04L 12/2809 |
| | | | 709/226 |
| 2009/0138958 A1* | 5/2009 | Baum | H04L 12/2809 |
| | | | 726/12 |
| 2009/0237210 A1 | 9/2009 | Ciesla et al. | |
| 2012/0295636 A1 | 11/2012 | Drucker | |

OTHER PUBLICATIONS

"Mobile Advertisers Forecast to Spend $1.8 Billion on Location-Based Campaigns in 2015", Sep. 2, 2010, ABI Search, New York, Retrieved from <URL: http://www.abiresearch.com/press/3502-Mobile+Advertisers+Forecast+to+Spend+$1.8+Billion+on+Location-Based+Campaigns+in+2015>.

\* cited by examiner

LOCATION-TRANSMITTING DEVICE FOR DETERMINING LOCATION OF A WIRELESS COMMUNICATION DEVICE

CROSS-REFERENCE TO RELATED APPLICATIONS

The present application is a continuation under 35 U.S.C. § 120 of U.S. patent application Ser. No. 13/515,001, filed on Jun. 11, 2012 and now issued as U.S. Pat. No. 9,258,680, which is a U.S. National Stare filing under 35 U.S.C. § 371 of International Application No. PCT/US2011/037314, filed on May 20, 2011 and entitled "LOCATION-TRANSMITTING DEVICE FOR DETERMINING LOCATION OF A WIRELESS COMMUNICATION DEVICE." U.S. patent application Ser. No. 13/515,001 and International Application No. PCT/US2011/037314, including any appendices or attachments thereof, are incorporated by reference herein in their entirety.

TECHNICAL FIELD

The present disclosure relates generally to wireless communication technologies and more specifically to location-transmitting devices.

BACKGROUND

Unless otherwise indicated herein, the approaches described in this section are not prior art to the claims in this application and are not admitted to be prior art by inclusion in this section.

As the use of cellular telephones and other wireless communication devices becomes ubiquitous, the number of commercial and other wireless services available to wireless device users besides ordinary voice and data communications has also increased. Some wireless services rely on the wireless network serving a wireless device to provide the geographic location of the wireless device (and thus its user) to enable or enhance the intended functionality of the service. Such services may be provided by the operator of the wireless network or by a third party.

One such service that is particularly well known is "enhanced 911" (E-911), which automatically delivers the location of a wireless device user to the dispatch center, or public service access point (PSAP), when the user places a call to 911 for emergency services. Such location information can be critical since a caller is often unable to inform the 911 operator verbally of his or her location and, because the call is not being made over a land line, there is no physical address associated with the calling party. Other wireless services available include a growing number of commercial location-based services (LBSs), such as information or entertainment services. LBSs may be selectively delivered or offered to individual wireless device users based on user proximity to a particular location, or may be customized based on the user's current location. Thus, in addition to basic voice and data communications, a cellular telephone or other wireless communication device can provide many other important and convenient services to its user if its location can be determined.

SUMMARY

In accordance with one or more embodiments of the disclosure, a location-transmitting device includes a radio-transmitting module configured to autonomously transmit a signal containing location data for the location-transmitting device to any nearby wireless communication device equipped to receive that signal, a memory module that stores the location data for the location-transmitting device, and a power supply configured to provide power to the radio-transmitting module.

In accordance with one or more embodiments of the disclosure, a method is provided for a location-transmitting device to provide location data to any nearby wireless communication device. The method includes accepting location data for a location, storing the location data in a memory module, and autonomously transmitting the location data to any nearby wireless communication device using a short range wireless transmitting device.

In accordance with one or more embodiments of the disclosure, a method is provided for a wireless device to transmit its location. The method includes using a short range radio communication protocol to receive, without prior interrogation, radio signals from any nearby autonomously transmitting radio-transmitting device, detecting location data in a radio signal from a nearby autonomously transmitting radio-transmitting device disposed at the location, and transmitting the location data to a third party.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
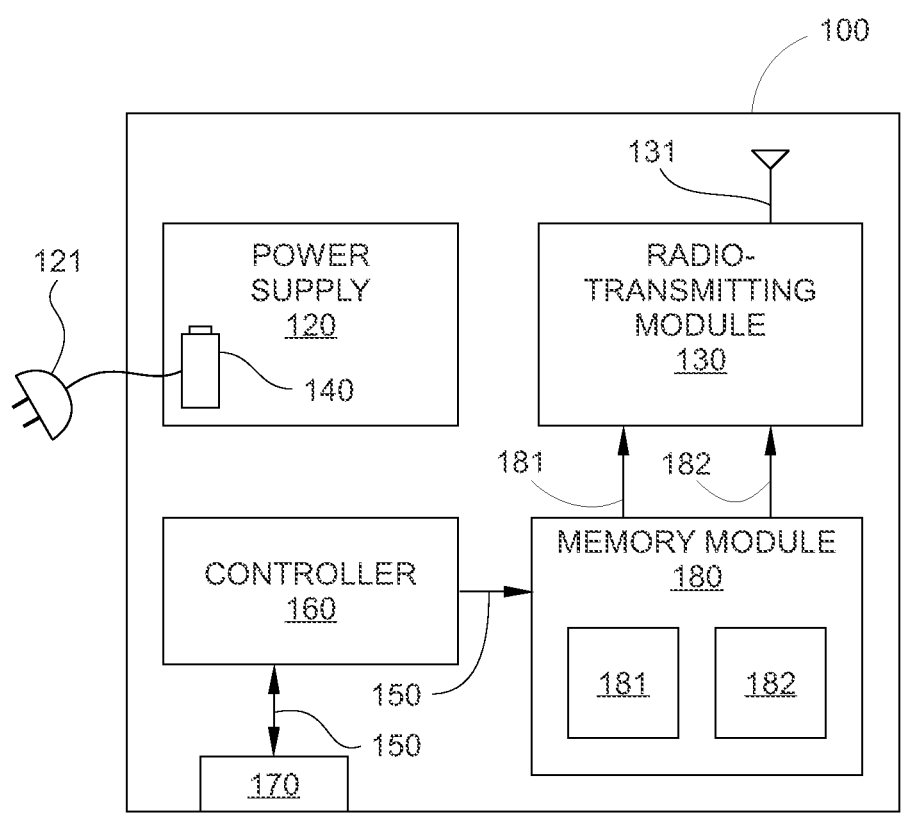
FIG. 1 shows a block diagram of an illustrative embodiment of a location-transmitting device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the Figures, can be arranged, substituted, combined, and designed in a wide variety of different configurations, all of which are explicitly contemplated and made part of this disclosure.

Cellular telephones and other wireless communication devices are valuable tools for providing user location to wireless service providers for the safety and convenience of the user, but this functionality suffers from an important limitation. Specifically, a common requirement for such services is that the wireless network serving the user, or a third-party location information provider, accurately determine the geographic location of the user, while in practice the two most common methods by which wireless networks determine geographic locations, i.e., assisted global positioning (A-GPS) and time-difference-of-arrival (TDOA), are frequently unable to provide more than an approximate position of the user.

A-GPS relies on a wireless communication device receiving signals transmitted by orbiting satellites in the GPS constellation. A-GPS suffers from the limitation that wireless communication devices located inside large buildings will often be unable to receive GPS signals of sufficient strength and/or from a sufficient number of GPS satellites to allow accurate location determination. Further, even if A-GPS can determine the general location of the wireless communication device, e.g., a specific building, precise location information cannot be resolved with a granularity necessary for many wireless services, e.g., in what room or on what floor the wireless communication device is disposed. Obviously, in a large office building or hotel, such information is of particular concern in E-911 calls.

TDOA involves the receipt of signals from a wireless communication device by multiple base stations in the serving network that each maintains an extremely precise clock. User location is calculated based on the difference in the times at which each base station receives signals from the wireless communication device. TDOA suffers from a number of limitations, including generally lower accuracy than is provided by A-GPS. In addition, TDOA becomes even less accurate in environments of strong multipath propagation, which is typical of urban areas. Furthermore, TDOA will not function at all when a signal from a wireless communication device can only be received by one or two base stations, which is often the case when a wireless communication device is located inside a large building.

Embodiments disclosed herein contemplate a small, low-power location-transmitting device that can be placed in a wide variety of fixed and, in some cases, mobile locations. The location-transmitting device is configured to autonomously transmit a signal that contains location data to any nearby and suitably configured wireless communication device, thereby enabling the wireless device to give accurate location information to wireless service providers.

FIG. 1 shows a block diagram of an illustrative embodiment of a location-transmitting device 100. Location-transmitting device 100 includes a power supply 120, a radio-transmitting module 130, a controller 160, and a memory module 180. Location-transmitting device 100 is configured to autonomously transmit accurate and precise location data to a suitably enabled wireless communication device, so that the wireless communication device has much more accurate location information than when relying on prior art schemes for determining user location.

Power supply 120 provides electric power for location-transmitting device 100. In the embodiment illustrated in FIG. 1, power supply 120 provides DC power to components of location-transmitting device 100 as required, including radio-transmitting module 130, controller 160, and memory module 180. In some embodiments, power supply 120 includes a DC power supply configured to operate on conventional AC power, via plug 121 and a conventional AC wall receptacle (not shown). Alternatively, the DC power supply may be hard-wired to an AC power source. In some embodiments, power supply 120 further includes a battery 140 that can act as a source of backup power to assure continued operation of location-transmitting device 100 in case of AC power outage. Alternatively, battery 140 may serve as the primary power source for location-transmitting device 100, so that location-transmitting device 100 may be used in areas in which conventional AC power is not available. Battery 140 may be a conventional or rechargeable battery.

Controller 160 executes instructions for the operation of location-transmitting device 100. To that end, controller 160 is configured to receive programming information 150, which may include operating instructions for location-transmitting device 100. Programming information 150 may further include location information 181 that is transmitted by radio-transmitting module 130 during normal operation of location-transmitting device 100. Such location information 181 corresponds to the precise location of location-transmitting device 100. Programming information 150 may also include control parameters 182 to be used by radio-transmitting module 130, such as transmit power level, transmission frequency, and the like. In some embodiments, controller 160 receives programming information 150 via a standardized wired connection, such as a universal serial bus (USB) connector 170 or other technically feasible connection mechanism. In some embodiments, controller 160 receives programming information 150 via a wireless connection, such as a Bluetooth transceiver. In some embodiments, the Bluetooth transceiver may be included in radio-transmitting module 130.

Memory module 180 stores control parameters 182, location information 181, and programming information 150. Memory module 180 includes one or more elements of digital data storage, e.g., a non-volatile type such as flash memory.

Radio-transmitting module 130 obtains location information 181 and control parameters 182 from memory module 180. Radio-transmitting module 130 transmits location information 181 from an antenna 131, which may be integral to location-transmitting device 100. In transmitting location information, radio-transmitting module 130 uses predetermined channel and protocol formats that are compatible with industry standards devised for this purpose. Such standards assure compatibility between location-transmitting device 100 and wireless communication devices so that a wireless communication device reliably receives location information 181 when transmitted by a nearby location-transmitting device 100. In some embodiments, such standards will advantageously include operation using Bluetooth communications protocols, since the majority of wireless communication devices currently in operation are equipped to receive Bluetooth transmissions.

The specific location information included in location information 181 may utilize a number of different standardized formats. Two of such formats are latitude/longitude and street address/unit number, where unit number may be any one of apartment number, room number, suite number, or the like. In some embodiments, location information 181 includes both formats. In an alternative embodiment, location-transmitting device 100 transmits a discrete code which in and of itself contains no location information, but corresponds to a database entry that provides such information. In some embodiments, the specific format for location information 181 is selected based on the location of location-transmitting device 100. For example, when location-transmitting device 100 is located in a hotel, the format of location information may include floor and room number.

Prior to operation, location-transmitting device 100 is programmed, positioned in the desired location, connected to an appropriate power source, and turned on. The programming process may be performed with any technically feasible wired or wireless connection to a computing device that is running a software application designed to support such programming. Once enabled, location-transmitting device 100 autonomously transmits location information 181, which can be received by wireless communication devices in relatively close proximity to location-transmitting device 100. In some embodiments, location-transmitting device 100 transmits location information 181 continuously. In some embodiments, location-transmitting device 100 transmits location information 181 periodically at regular intervals. In some embodiments, location-transmitting device 100 transmits location information 181 periodically at somewhat random intervals in order to minimize the probability of consecutive "collisions" with transmissions of other nearby location-transmitting devices. In some embodiments, the interval between periodic transmissions is on the order of a few seconds.

It is noted that no communications are required from the wireless devices 220 in order for location-transmitting device 100 to transmit location information 181, which is in contrast to near-field radio frequency identification (RFID) tags. Near-field RFID tags only transmit a signal when interrogated by an RFID reader device. Further, near-field RFID tags generally produce a very weak signal that can only be detected in the near-field region of the RFID reader, i.e., when the respective antennae of the RFID tag and the RFID reader are close enough to physically interact with each other and are not simply transmitting and receiving conventional RF signals.

Figure 2:
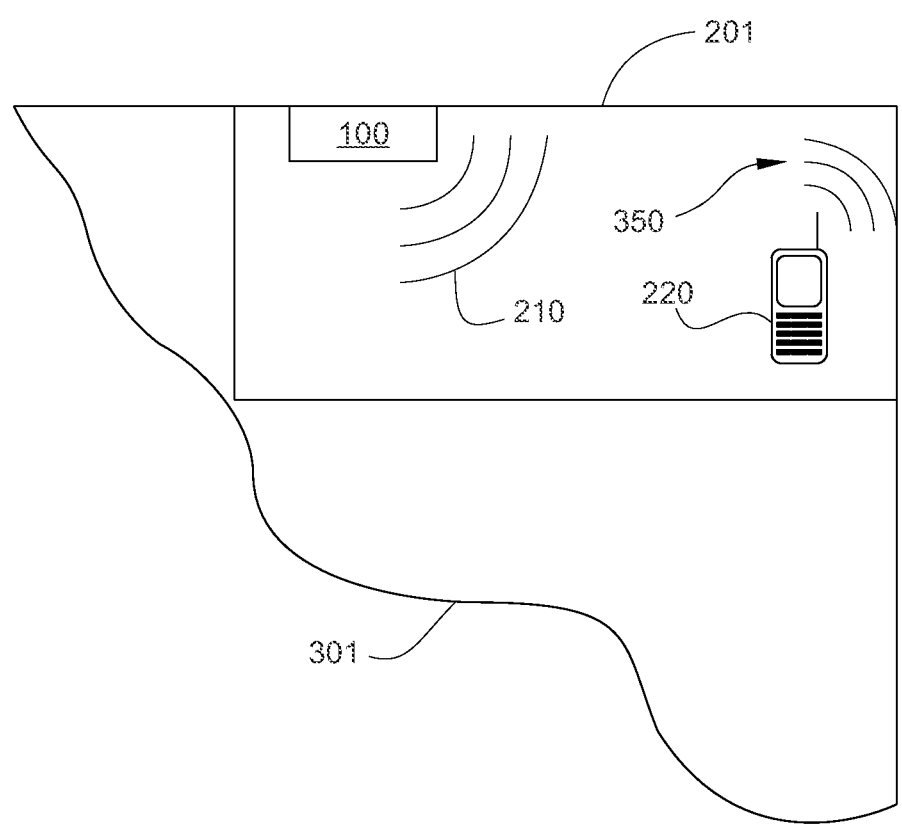
FIG. 2 shows a block diagram of an illustrative embodiment of a location-transmitting device positioned in a room in a building.

FIG. 2 shows a block diagram of an illustrative embodiment of location-transmitting device 100 positioned in a room 201 in a building 301. Note that in other embodiments location-transmitting device 100 may be located outdoors. Building 301 may be a hotel, office building, or other similar structure, and includes a number of rooms, and in some cases multiple floors. In FIG. 2, location-transmitting device 100 has been programmed and enabled, and is transmitting location information 181 via transmissions 210. Because room 201 is only one of a very large number of rooms distributed throughout building 301, location information 181 includes a room number and a floor in addition to the street address of building 301. Transmissions 210 are received by a wireless device 220 that is configured for compatible reception of transmissions 210 and disposed in close proximity to (i.e. "within range of") location-transmitting device 100. Multiple compatible wireless devices may be within range of the location-transmitting device 100 and receiving transmissions 210. In the embodiment illustrated in FIG. 2, location-transmitting device 100 is configured as a transmit-only device, and therefore the air interface between location-transmitting device 100 and a proximate wireless device 220 is unidirectional. It is noted that the configuration of wireless devices 220 for reception of transmissions 210 may be part of factory provisioning, e.g., in the case of new wireless devices, or may be done in the field, using conventional over-the-air provisioning protocols known in the art, e.g., in the case of existing wireless devices.

The approximate maximum distance between location-transmitting device 100 and wireless device 220 that constitutes "proximity" for purposes of enabling reception can be controlled by adjusting the transmit power level of location-transmitting device 100. In embodiments in which transmissions 210 are Bluetooth transmissions, such a maximum distance may be between about two or three meters and about 100 meters. Of course, the maximum distance of operation may also be restricted by intervening structure, such as walls, ceilings, and floors, which can advantageously limit transmissions 210 to remain primarily in a single room, thereby allowing individual location-transmitting devices 100 to reliably inform discrete room number locations within large buildings.

Wireless device 220 retains location information received from location-transmitting device 100 until it receives location information 181 from a different location-transmitting device 100. In some embodiments, upon no longer receiving transmissions 210, wireless device 220 retains location information 181 from location-transmitting device 100 for no more than a pre-determined timeout period, e.g., about 10 seconds. After the timeout period, wireless device 220 purges the location information 181 on the assumption that wireless device 220 is no longer proximate to location-transmitting device 100 and therefore the stored location information 181 is invalid. In some embodiments, location information 181 may be displayed on wireless device 220 and/or stored in a user-accessible fashion in wireless device 220. In some embodiments, wireless device 220 may provide a visual indication to the user when wireless device 220 is currently receiving location information 181, such as an icon displayed on a screen of wireless device 220.

Figure 3:
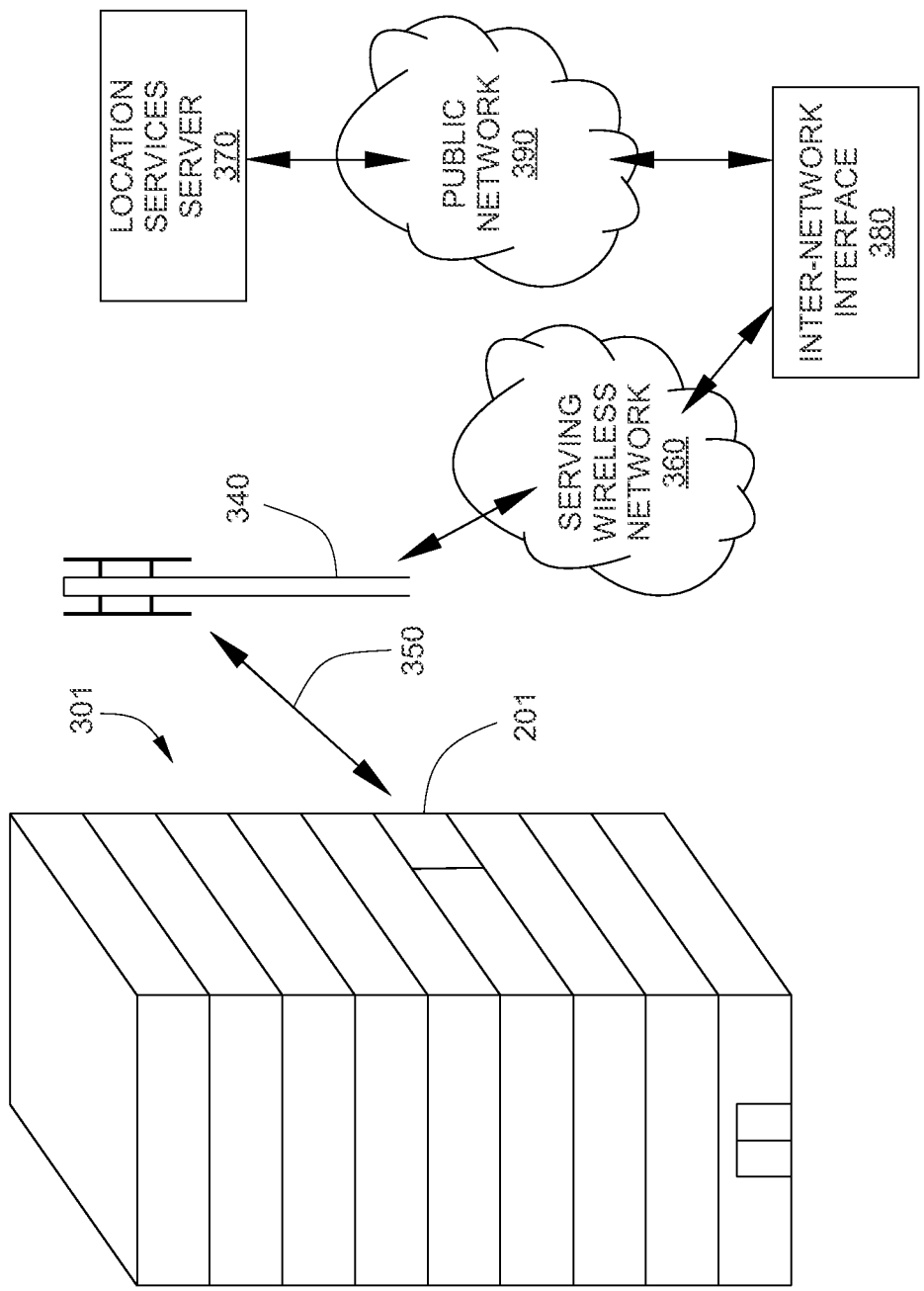
FIG. 3 shows a schematic diagram of the room in FIG. 2 with a wireless device located therein and transmitting location data to a wireless network base station, according to an embodiment of the disclosure.

Circumstances under which wireless device 220 may be required or allowed to report its location, or to participate in the determination of its location, are determined by standards known in the art governing wireless network operation. Under such circumstances, and when wireless device 220 has current location information 181 from location-transmitting device 100, wireless device 220 conveys location information 181 to a network base station 340 of a serving wireless network 360, as shown in FIG. 3. FIG. 3 shows a schematic diagram of room 201 in FIG. 2 with wireless device 220 located therein and transmitting location data to network base station 340, according to an embodiment of the disclosure. Wireless device 220 conveys location information 181 using protocols defined by standards known in the art governing the interface between wireless device 220 and serving wireless network 360. Specifically, location information 181 is coded in protocols specified for a wireless device—base station air interface 350. The manner in which wireless device 220 conveys location information 181 to serving network base station 340 may vary depending on the immediate application for which the location information is to be used. For example, in one embodiment, wireless device 220 autonomously sends location information 181 as part of a service request for a feature that requires, or is enhanced by, location information 181. In another example embodiment, wireless device 220 sends location information 181 as a response to a request for such information from serving wireless network 360.

In some embodiments, current protocols known in the art in existing air interface standards may be amended with new enabling protocols. For example, location information 181 may be conveyed from wireless device 220 to network base station 340 on air interface 350 in accordance with existing conventional practices, except that certain new location formats enabled by the present disclosure, e.g., address/room number, may be accommodated by new air interface communications protocols or new formats within existing protocols.

In some embodiments, network base station 340 conveys, if required, location information 181 received from wireless device 220 to serving wireless network 360. Existing conventional practices and protocols known in the art may be used for the conveyance of location information 181. In some embodiments, serving wireless network 360 in turn conveys location information 181 to a location services server 370 through an inter-network interface 380 and a public network 390. Public network 390 may include the public switched telephone network, the Internet, and the like. Using conventional practices, and depending upon the characteristics of the serving wireless network and the public network used, inter-network interface 380 may be a mobile telephone switching office, a media gateway, or a packet data service node. In alternative embodiments, location services server 370 is connected directly to serving wireless network 360. In other alternative embodiments, a private network may be used in lieu of public network 390. Use of other combinations and configurations of networks and network interfaces also falls within the scope of the present disclosure.

In some embodiments, wireless device 220 may have enhanced capabilities and can measure the signal level of transmissions 210 received from location-transmitting device 100. In such embodiments, when wireless device 220 is positioned to receive location information 181 from more than one location-transmitting device 100, wireless device 220 can determine the closest location-transmitting device 100 based on receive signal level. In such embodiments, location-transmitting device 100 may also be enhanced to transmit additional standardized protocols that identify the power level at which transmissions 210 are being transmitted. Consequently, wireless device 220 or another entity connected by wireless device—base station air interface 350 calculates the approximate path loss between wireless device 220 and location-transmitting device 100. Knowledge of the path loss between wireless device 220 and location-transmitting device 100 enables additional position-determining functionality. In a first embodiment, wireless device 220 can communicate the transmit power information reported by location-transmitting device 100, the receive signal level, and location information 181, so that an entity connected by wireless device—base station air interface 350 can calculate the approximate distance between wireless device 220 and location-transmitting device 100. In a second embodiment, wireless device 220 calculates the path loss directly and communicates this information along with location information 181 to an entity connected by wireless device—base station air interface 350 so that said entity calculates the approximate distance between wireless device 220 and location-transmitting device 100. In a third embodiment, wireless device 220 can, based on calculated path loss, further calculate an approximate distance from location-transmitting device 100 and communicate this information along with location information 181. One of skill in the art will appreciate that each of the three foregoing embodiments advantageously provide even more accurate location information than that provided by location information 181 alone.

In some embodiments, location-transmitting device 100 may be embedded in or connected to another device, for example a monitoring device such as a smoke alarm. In such embodiments, the other device may provide to location-transmitting device 100 an indication of a condition, for example the detection of smoke. The location-transmitting device 100, through appropriate extensions of protocol formats, may then include this indication of condition as part of the location information 181 it transmits to nearby wireless devices 220. Consequently, when a nearby wireless device 220 conveys location information 181 to a third party through air interface 350, that information may include the indication of condition. Those familiar with the art will appreciate that, in the same manner, any reasonable number of indications of condition can be conveyed, and that such indications of condition may be binary in nature or may be of variable value. In another embodiment, an indication of condition received as part of location information 181 by a wireless device 220 may cause that wireless device to perform some function. For example, a wireless device may be configured such that, upon receiving an indication of condition in location data, transmitted from a nearby location-transmitting device 100, that indicates that smoke is being detected by a smoke detector to which the location-transmitting device 100 is connected, then the wireless device will automatically place a call to 911.

In some embodiments, location-transmitting device 100 may be positioned in a mobile location rather than at a fixed location. For example, location-transmitting device 100 may be positioned in a mass transit vehicle or rail car. In such an embodiment, location information 181 transmitted by location-transmitting device 100 will not be a fixed location, but rather the identity of the moving conveyance. Conveyance identity may be used by serving wireless network 360 for a variety of features, such as specialized network handling for the user of wireless device 220 when on a high-speed train.

Figure 4:
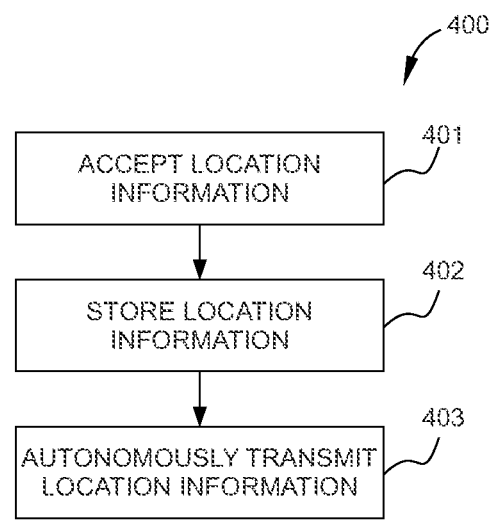
FIG. 4 sets forth a flowchart summarizing a method for a location-transmitting device to provide location data to any nearby wireless communication device, according to an embodiment of the disclosure.

FIG. 4 sets forth a flowchart summarizing a method 400 for a location-transmitting device to provide location data to any nearby wireless communication device, according to an embodiment of the disclosure. For ease of description, method 400 is described in terms of a location-transmitting device substantially similar to location-transmitting device 100. One of skill in the art will appreciate, however, that method 400 may be performed by other configurations of location-transmitting devices.

In operation 401, location-transmitting device 100 accepts (e.g., is programmed with) location information 181 and, if required, control parameters 182.

In operation 402, location-transmitting device 100 stores location information 181 and, if required, control parameters 182, in memory module 180.

In operation 403, once placed in the location defined by location information 181 and enabled (for example, by plugging it in and turning it on), location-transmitting device 100 autonomously transmits location information 181 to any nearby wireless device 220 using radio-transmitting module 130. In some embodiments, radio-transmitting module 130 includes a Bluetooth transmitter.

Figure 5:
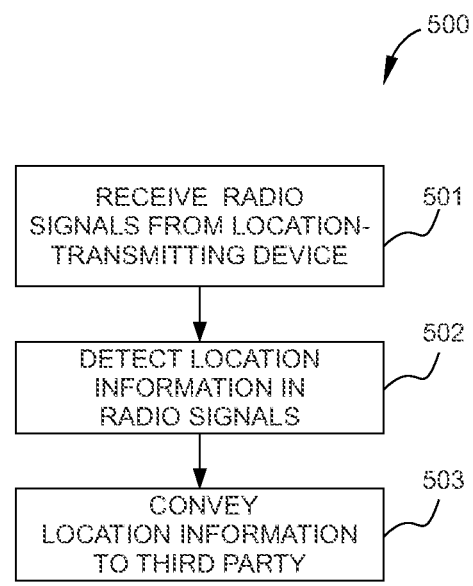
FIG. 5 sets forth a flowchart summarizing a method for a wireless device to obtain and transmit its location, according to an embodiment of the disclosure.

FIG. 5 sets forth a flowchart summarizing a method 500 for a wireless device to obtain transmit its location according to an embodiment of the disclosure. For ease of description, method 500 is described in terms of a location-transmitting device and a wireless communication device substantially similar to location-transmitting device 100 and wireless device 220, respectively. One of skill in the art will appreciate, however, that method 400 may be performed by other configurations of location-transmitting devices. Prior to the first operation of method 500, location-transmitting device 100 is programmed and placed in operation in accordance with method 400.

In operation 501, wireless device 220 uses a short-range radio communication receiver to receive, without prior interrogation, radio signals that are autonomously transmitted, using standardized protocols, from any nearby radio-transmitting device, such as location-transmitting device 100.

In operation 502, wireless device 220 detects location information 181 in a radio signal from an autonomously transmitting radio-transmitting device disposed nearby, such as location-transmitting device 100.

In operation 503, upon circumstances requiring or allowing it to do so, wireless device 220 conveys location information 181 to a third party, e.g., any entity communicating with wireless device 220 via wireless device—base station air interface 350. For example, the third party may be an E-911 dispatch center, a provider of a commercial LBS, or the like.

In sum, some embodiments of the disclosure provide systems and methods that enable accurate determination of the location of a wireless communication device, even in a large building. In addition, accurate location information associated with the wireless communication device may be automatically and reliably conveyed to a serving wireless network of the wireless communication device and, if desired, to providers of location-based services to the wireless communication device user. Thus, embodiments of the disclosure herein address known limitations in the reliability and accuracy of prior art approaches for determining the geographic location of a wireless communication device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method under control of a wireless communication device, the method comprising:
   using a short-range radio communication protocol to receive, without prior interrogation, radio signals from a plurality of nearby autonomously transmitting radio-transmitting devices;
   detecting, by the wireless communication device, location data in a radio signal from a nearby autonomously transmitting radio-transmitting device of the plurality of nearby autonomously transmitting radio-transmitting devices, wherein the radio signal is a strongest radio signal that includes the location data;
   retaining, by the wireless communication device, the location data from the nearby autonomously transmitting radio-transmitting device, wherein retaining the location data comprises retaining the location data until the wireless communication device detects the location data from a different nearby autonomously transmitting radio-transmitting device;
estimating a distance of the wireless communication device from the nearby autonomously transmitting radio-transmitting device based on a received signal level of the radio signal; and
transmitting, by the wireless communication device, the retained location data and data that represents the estimated distance to a third party.

2. The method of claim 1, wherein a format of the location data is selected from one or more of: latitude/longitude coordinates, street address, street address with unit number, raw global positioning system (GPS) data, a location-specific code corresponding to a location database entry, and a combination thereof.

3. The method of claim 1, wherein using the short-range radio communication protocol comprises using a Bluetooth protocol.

4. The method of claim 1, wherein transmitting the data that represents the estimated distance includes transmitting data that represents a range of distances.

5. The method of claim 1, wherein estimating the distance of the wireless communication device from the nearby autonomously transmitting radio-transmitting device is based on a difference between a transmit power of the nearby autonomously transmitting radio-transmitting device and the received signal level.

6. The method of claim 1, wherein estimating the distance of the wireless communication device from the nearby autonomously transmitting radio-transmitting device based on the received signal level comprises calculating a path loss between the nearby autonomously transmitting radio-transmitting device and the wireless communication device.

7. The method of claim 6, further comprising determining the distance of the wireless communication device from the nearby autonomously transmitting radio-transmitting device based on the calculated path loss.

8. The method of claim 6, further comprising:
receiving a transmit power from the nearby autonomously transmitting radio-transmitting device,
wherein calculating the path loss includes calculating the path loss based on the transmit power and the received signal level.

9. A method under control of a wireless communication device, the method comprising:
using a short-range radio communication protocol to receive, without prior interrogation, radio signals from a plurality of nearby autonomously transmitting radio-transmitting devices;
detecting, by the wireless communication device, location data in a radio signal from a nearby autonomously transmitting radio-transmitting device of the plurality of nearby autonomously transmitting radio-transmitting devices, wherein the radio signal is a strongest radio signal that includes the location data;
measuring, by the wireless communication device, a received signal level of the radio signal from the nearby autonomously transmitting radio-transmitting device; and
transmitting, by the wireless communication device, the location data and the received signal level of the radio signal to a third party.

10. The method of claim 9, wherein a format of the location data is selected from one or more of: latitude/longitude coordinates, street address, street address with unit number, raw global positioning system (GPS) data, a location-specific code corresponding to a location database entry, and a combination thereof.

11. The method of claim 9, wherein using the short-range radio communication protocol comprises using a Bluetooth protocol.

12. The method of claim 9, further comprising estimating a distance of the wireless communication device from the nearby autonomously transmitting radio-transmitting device based on the received signal level, wherein the estimated distance includes a range of distances.

13. The method of claim 9, further comprising estimating a distance of the wireless communication device from the nearby autonomously transmitting radio-transmitting device based on a difference between a transmit power of the nearby autonomously transmitting radio-transmitting device and the received signal level.

14. The method of claim 9, further comprising estimating a distance between the wireless communication device and the nearby autonomously transmitting radio-transmitting device based on the received signal level, wherein estimating the distance based on the received signal level comprises calculating a path loss between the nearby autonomously transmitting radio-transmitting device and the wireless communication device.

15. A location transmitter device, comprising:
a radio transmitter module configured to autonomously transmit a signal, which includes location data for the location transmitter device, to a nearby wireless communication device, wherein the nearby wireless communication device conveys the location data to a third party through an air interface, and wherein the location data includes an indication of a condition of a monitor device coupled to the location transmitter device;
a memory module coupled to the radio-transmitter module and configured to store the location data for the location transmitter device; and
a power supply coupled to the radio-transmitter module and configured to provide power to the radio transmitter module.

16. The location transmitter device of claim 15, wherein the radio-transmitter module is configured to autonomously transmit the signal that includes the location data, without being interrogated by an external device.

17. The location transmitter device of claim 15, wherein the radio-transmitter module is configured to transmit the signal that includes the location data, by use of a short-range radio communication protocol.

18. The location transmitter device of claim 17, wherein the short-range radio communication protocol comprises a Bluetooth protocol.

19. The location transmitter device of claim 15, wherein the radio-transmitter module is configured to continuously transmit the signal that includes the location data.

20. The location transmitter device of claim 15, wherein the radio-transmitter module is configured to intermittently transmit the signal that includes the location data.

21. The location transmitter device of claim 15, wherein the location data includes a transmit power of the location transmitter device.

* * * * *

UNITED STATES PATENT AND TRADEMARK OFFICE
CERTIFICATE OF CORRECTION

PATENT NO. : 9,894,481 B2
APPLICATION NO. : 14/973721
DATED : February 13, 2018
INVENTOR(S) : Drucker Page 1 of 1

It is certified that error appears in the above-identified patent and that said Letters Patent is hereby corrected as shown below:

In the Specification

In Column 1, Line 11, delete "Stare filing" and insert -- Stage filing --, therefor.

In Column 9, Line 10, delete "In sum, some" and insert -- In some --, therefor.

Signed and Sealed this
Fifth Day of June, 2018

Andrei Iancu
*Director of the United States Patent and Trademark Office*